(12) United States Patent
Pasquero et al.

(10) Patent No.: US 9,685,001 B2
(45) Date of Patent: Jun. 20, 2017

(54) SYSTEM AND METHOD FOR INDICATING A PRESENCE OF SUPPLEMENTAL INFORMATION IN AUGMENTED REALITY

(71) Applicant: Research In Motion Limited, Waterloo (CA)

(72) Inventors: Jerome Pasquero, Quebec (CA); Jeffrey Charles Bos, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 540 days.

(21) Appl. No.: 13/840,023

(22) Filed: Mar. 15, 2013

(65) Prior Publication Data

US 2014/0267010 A1   Sep. 18, 2014

(51) Int. Cl.
   *G06T 19/00* (2011.01)
   *G06F 3/01* (2006.01)
(52) U.S. Cl.
   CPC ............ *G06T 19/006* (2013.01); *G06F 3/011* (2013.01); *G06F 3/013* (2013.01)
(58) Field of Classification Search
   CPC ............ G06T 19/006; G06F 3/13; G06F 3/11
   See application file for complete search history.

(56) References Cited

U.S. PATENT DOCUMENTS

| | | | | |
|---|---|---|---|---|
| 2003/0052903 | A1* | 3/2003 | Weast | 345/690 |
| 2010/0145976 | A1* | 6/2010 | Higgins | G06F 17/3064 707/765 |
| 2010/0238161 | A1 | 9/2010 | Varga et al. | |
| 2012/0007772 | A1* | 1/2012 | Parssinen et al. | 342/176 |
| 2012/0019557 | A1 | 1/2012 | Aronsson et al. | |
| 2012/0133754 | A1* | 5/2012 | Lee | G06F 3/013 348/78 |
| 2012/0176410 | A1 | 7/2012 | Meier et al. | |
| 2012/0206334 | A1 | 8/2012 | Osterhout et al. | |
| 2012/0287123 | A1 | 11/2012 | Starner | |
| 2012/0293548 | A1 | 11/2012 | Perez et al. | |

(Continued)

OTHER PUBLICATIONS

Tonet, O.; Search report from corresponding European Application No. 13159632.2; search completed Aug. 6, 2013.

(Continued)

*Primary Examiner* — Kumar Patel
*Assistant Examiner* — Sejoon Ahn
(74) *Attorney, Agent, or Firm* — Jon Gibbons; Fleit Gibbons Gutman Bongini & Bianco P.L.

(57) ABSTRACT

A method and system are provided for indicating a presence of supplemental information in augmented reality to a user. The method includes capturing a field of view of a camera, obtaining supplemental information for at least one object in the captured field of view, displaying the captured field of view on a display and tracking a point of regard of the user. The point of regard is indicative of an area on the display at which the gaze of the user is focused. The method also includes, for each object associated with supplemental information, displaying, overlaid the captured field of view, a respective indicator that the supplemental information is associated with the object if one or more criteria are satisfied. The one or more criteria are based on at least a proximity between an image of the object in the captured field of view and the point of regard.

18 Claims, 15 Drawing Sheets

(56) References Cited

U.S. PATENT DOCUMENTS

| | | | | |
|---|---|---|---|---|
| 2013/0176208 | A1* | 7/2013 | Tanaka | G06F 3/013 345/156 |
| 2014/0063055 | A1* | 3/2014 | Osterhout | G06F 3/005 345/633 |
| 2014/0193038 | A1* | 7/2014 | Kasahara | G06K 9/228 382/103 |
| 2014/0267399 | A1* | 9/2014 | Zamer | H04L 67/20 345/633 |
| 2015/0109191 | A1* | 4/2015 | Johnson | G10L 15/22 345/156 |
| 2015/0138079 | A1* | 5/2015 | Lannsjo | G06F 3/013 345/156 |
| 2015/0169525 | A1* | 6/2015 | Palm | G06F 17/241 715/230 |
| 2016/0179201 | A1* | 6/2016 | Anderson | G06F 3/013 345/156 |

OTHER PUBLICATIONS

Bilton, N.; "Google Begins Testing Its Augmented-Reality Glasses"; Apr. 4, 2012; http://bits.blogs.nytimes.com/2012/04/04/google-begins-testing-its-augmented-reality-glasses/.

Tall, M.; "Wearable Augmented Reality System using Gaze Interaction (Park et al., 2008)"; Nov. 17, 2008; http://gazeinteraction.blogspot.ca/2008/11/wearable-augmented-reality-system-using.html.

Vogel, U. et al.; Abstract of "Bi-directional OLED microdisplay for interactive see-through HMDs: Study toward integration of eye-tracking and informational facilities"; Journal of the Society for Information Display; vol. 17, Issue 3; Mar. 2009; http://onlinelibrary.wiley.com/doi/10.1889/JSID17.3.175/abstract.

Stevens, R.; "Apple of My Eye, Tracking?"; Jan. 21, 2010; http://thinkeyetracking.com/2010/01/apple-of-my-eye-tracking/.

"EyeTap: The eye itself as a display and camera"; Retrieved online Feb. 19, 2013; http://www.eyetap.org/research/eyetap.html.

"The Future of Augmented Reality"; Sep. 14, 2012; http://www.frontal-labs.com/the-future-of-augmented-reality/.

"An Eye Tracking System for High Performance Augmented Reality Applications"; May 15, 2008; http://www.infodif.com/blog/eye-tracking-system-high-performance-augmented-reality-applications/.

"Fraunhofer IPMS show world first OLED microdisplay based Eyetracking HMD at SID-2011"; Retrieved online Feb. 19, 2013; http://www.oled-display.net/fraunhofer-ipms-show-world-first-oled-microdisplay-based-eyetracking-hmd-at-sid-2011/.

"Layar, worlds first mobile Augmented Reality browser"; Uploaded Jun. 15, 2009; http://www.youtube.com/watch?v=b64_16K2e08.

"Visual directed browsing"; Uploaded Dec. 18, 2010; http://www.youtube.com/watch?v=gtuGSWDVdQU.

Toyama, T. et al.; "Gaze Guided Object Recognition Using a Head-Mounted Eye Tracker"; In *Proceedings of the Symposium on Eye Tracking Research and Applications* (ETRA '12), Stephen N. Spencer (Ed.); ACM, New York, NY, USA; pp. 91 to 98; 2012; http://www.dfki.de/It/publication_show.php?id=5815.

Antti, A. et al.; "An Augmented Reality Interface to Contextual Information"; Virtual Reality; vol. 15, pp. 161 to 173; 2011; http://research.ics.aalto.fi/mi/publications.shtml.

"Top 10 iPhone travel apps"; Oct. 23, 2009; http://www.telegraph.co.uk/technology/apple/6417837/Top-10-iPhone-travel-apps.html.

"Mobile eye tracking—Tobii Glasses"; Retrieved online Feb. 19, 2013; http://www.tobii.com/en/eye-tracking-research/global/products/hardware/tobii-glasses-eye-tracker/.

Vogel, U.; "Technology Trend and Application of OLED-on-CMOS (OLEDoS)"; Available online at least as early as 2012.

* cited by examiner

SYSTEM AND METHOD FOR INDICATING A PRESENCE OF SUPPLEMENTAL INFORMATION IN AUGMENTED REALITY

TECHNICAL FIELD

The following relates generally to indicating a presence of supplemental information in augmented reality to a user of an electronic device.

DESCRIPTION OF THE RELATED ART

Many electronic devices, including mobile devices, are capable of providing augmented reality to enhance a view of a scene of the real world. For example, the augmented reality device may supplement the real world view with computer-generated elements, text, images or other information related to objects in the scene. This supplemental information may be presented to the user overlaid the real world view near the object to which the supplemental information pertains.

BRIEF DESCRIPTION OF THE DRAWINGS

Example embodiments will now be described making reference to the appended drawings wherein.

DETAILED DESCRIPTION

Figure 1:
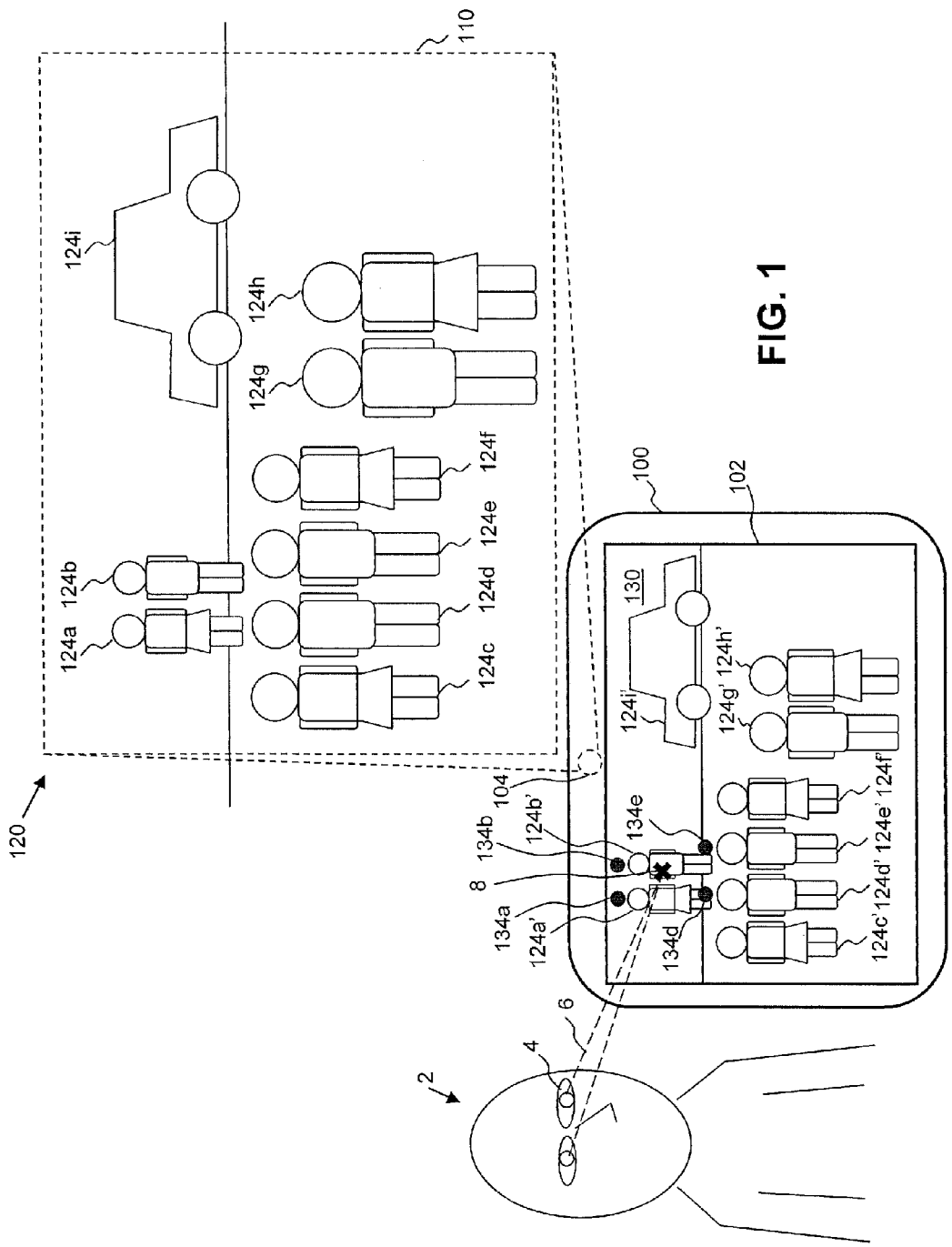
FIG. 1 is a diagram of an example mobile device for providing augmented reality, viewing a scene.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

An electronic device capable of providing augmented reality, such as a pair of augmented reality glasses or a mobile device running an augmented reality application, may capture a scene that includes numerous objects. For example, an electronic device may capture a scene that includes a person standing on the sidewalk, in front of a building. The electronic device may be capable of performing facial recognition to obtain the identity of the person and display the person's name overlaid the view of the person in the scene. The electronic device may also be capable of determining the location of the building behind the person using GPS information to display the address of the building overlaid the view of the building in the scene. It can be appreciated that the electronic device may obtain and display supplemental information regarding a number of objects captured in the scene.

A scene of the real world may include numerous objects for which the electronic device can display supplemental information. In the example above, the scene may also include other people on the sidewalk, other buildings along the side walk and/or in the background, cars along a road in front of the sidewalk, etc. Consequently, displaying supplemental information for each object in the scene may crowd the user's view with too much information, which can distract the user and/or obstruct the user's view of the real world. Further, supplemental information on a particular object may not be desired by the user, such as when the object and/or the supplemental information is not of interest to the user.

Therefore, it has been recognized that electronic devices capable of providing augmented reality may present an amount of supplemental information that is distracting, obstructing and/or otherwise undesired by a user. To address this, the following describes one or more methods, computer readable storage medium and electronic devices operable to indicate a presence of supplemental information in augmented reality.

In one aspect, there is provided a method of indicating a presence of supplemental information in augmented reality to a user of an electronic device. The electronic device includes a camera and a display. The method includes: capturing a field of view of the camera; obtaining supplemental information for at least one object in the captured field of view; displaying the captured field of view on the display; tracking a point of regard of the user, the point of regard being indicative of an area on the display at which the gaze of the user is focused; and for each object associated with supplemental information, displaying, overlaid the captured field of view, a respective indicator if one or more criteria are satisfied, the indicator being indicative that the supplemental information is associated with the object, the one or more criteria being based on at least a proximity between an image of the object in the captured field of view and the point of regard.

In another aspect, there is provided a computer readable storage medium for indicating a presence of supplemental information in augmented reality to a user. The computer readable storage medium includes computer executable instructions for: capturing a field of view of a camera; obtaining supplemental information for at least one object in the captured field of view; displaying the captured field of view on a display; tracking a point of regard of the user, the point of regard being indicative of an area on the display at which the gaze of the user is focused; and for each object associated with supplemental information, displaying, overlaid the captured field of view, a respective indicator if one or more criteria are satisfied, the indicator being indicative that the supplemental information is associated with the object, the one or more criteria being based on at least a proximity between an image of the object in the captured field of view and the point of regard.

In another aspect, there is provided an electronic device that includes a processor coupled to memory. The memory stores computer executable instructions for: capturing a field of view of a camera; obtaining supplemental information for at least one object in the captured field of view; displaying the captured field of view on a display; tracking a point of regard of the user, the point of regard being indicative of an area on the display at which the gaze of the user is focused; and for each object associated with supplemental information, displaying, overlaid the captured field of view, a respective indicator if one or more criteria are satisfied, the indicator being indicative that the supplemental information is associated with the object, the one or more criteria being based on at least a proximity between an image of the object in the captured field of view and the point of regard.

In another aspect, there is provided a method of indicating a presence of supplemental information in augmented reality to a user of a head mounted display. The method includes: capturing a field of view of the user through the head mounted display; obtaining supplemental information for at least one object in the field of view; tracking a point of regard of the user, the point of regard being indicative of an area in the field of view at which the gaze of the user is focused; and for each object associated with supplemental information, displaying, overlaid the field of view, a respective indicator if one or more criteria are satisfied, the indicator being indicative that the supplemental information is associated with the object, the one or more criteria being based on at least a proximity between the object and the point of regard.

In another aspect, there is provided a computer readable storage medium for indicating a presence of supplemental information in augmented reality to a user. The computer readable storage medium includes computer executable instructions for: capturing a field of view of the user through a head mounted display; obtaining supplemental information for at least one object in the field of view; tracking a point of regard of the user, the point of regard being indicative of an area in the field of view at which the gaze of the user is focused; and for each object associated with supplemental information, displaying, overlaid the field of view, a respective indicator if one or more criteria are satisfied, the indicator being indicative that the supplemental information is associated with the object, the one or more criteria being based on at least a proximity between the object and the point of regard.

In another aspect, there is provided an electronic device that includes a head mounted display and a processor coupled to memory. The memory stores computer executable instructions for: capturing a field of view of the user through the head mounted display; obtaining supplemental information for at least one object in the field of view; tracking a point of regard of the user, the point of regard being indicative of an area in the field of view at which the gaze of the user is focused; and for each object associated with supplemental information, displaying, overlaid the field of view, a respective indicator if one or more criteria are satisfied, the indicator being indicative that the supplemental information is associated with the object, the one or more criteria being based on at least a proximity between the object and the point of regard.

Referring to FIG. 1, a diagram of an electronic device for providing augmented reality, such as a mobile device 100, viewing a scene 102 is provided. The scene 120 includes numerous objects 124a-124i. In this example, objects 124a-124h are persons, and object 124i is a car. Relative to the mobile device 100, objects 124a, 124b, 124i are positioned furthest away from the mobile device 100, followed by objects 124c-124f, and followed by objects 124g, 124g (which are closest to the mobile device 100).

The mobile device 100 uses a camera, such as a built-in forward facing camera device 104 to capture the scene 120 (the camera device 104 is shown in a dotted line to indicate that the camera device 104 faces the scene 120 in front of the mobile device 100 and is housed in the face of the mobile device 100 opposite the display 102). The mobile device 100 displays an image 130 of the scene 120 on the display 102. The image 130 corresponds to the scene 120 captured in the field of view 110 of the camera device 104. Since the image 130 corresponds with the scene 120, the image 130 includes object images 124a'-124i' corresponding to objects 124a-124i.

In FIG. 1, a user 2 is viewing the display 102 of a mobile device 100. The mobile device 100 is situated in front of the user 2. The user 2 has a pair of eyes 4 that have associated therewith, a gaze direction 6 (i.e. the direction towards which the user is looking), and a point of regard 8 indicative of the area at which the user's gaze is focused (i.e. the specific area within the user's field of view that the user is looking at). In this example, the gaze direction 6 is towards the display 102, and the point of regard 8 is focused on a portion of the object image 124b'.

The mobile device 100 can be operable to track the gaze direction 6 and point of regard 8 of the user 2 using one or more known techniques. The concept of gaze tracking (i.e. tracking the point of regard 8 of a user 2) is well known and a number of different techniques have been developed. For example, the mobile device 100 can be configured to include, on the front face of the mobile device 100, a backward facing camera device (i.e. facing the user 2 when the mobile device 100 is normally in use), which includes a light source, and a distance sensor (not shown in FIG. 1). As discussed further below, the mobile device 100 can use the backward facing camera device to perform eye tracking based on the pupil center corneal reflection (PCCR) method, for example. The determined point of regard 8 can be used to infer what the user 2 is interested in on the display 102. In the example of FIG. 1, the point of regard 8 can be used to infer that the user 2 may be interested in the object 124b whose object image 124b' overlaps with the point of regard 8, and/or other objects whose object image is near the point of regard 8, such as objects images 124a', 124d' and 124e'.

The mobile device 100 may obtain supplemental information regarding the objects 124a-124i by using any number of techniques known or described herein for providing augmented reality. However, instead of automatically displaying the supplemental information on the display 102 overlaid the image 130, the mobile device 100 determines the object images near the point of regard 8 of the user 2, and displays indicators that supplemental information is available for each such object. In the example of FIG. 1, indicators 134a, 134b, 134d and 134e, in the form of blue colour dots, are displayed near the object images 124a', 124b' and 124d' and 124e', respectively.

Figure 2B:
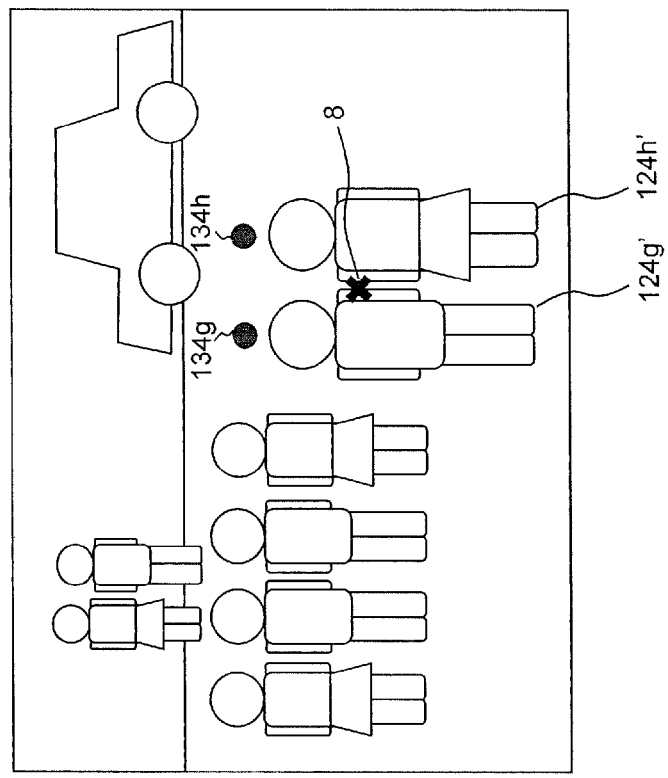
FIGS. 2A-2C are plan views of an example display of a mobile device viewing a scene.
Figure 2A:
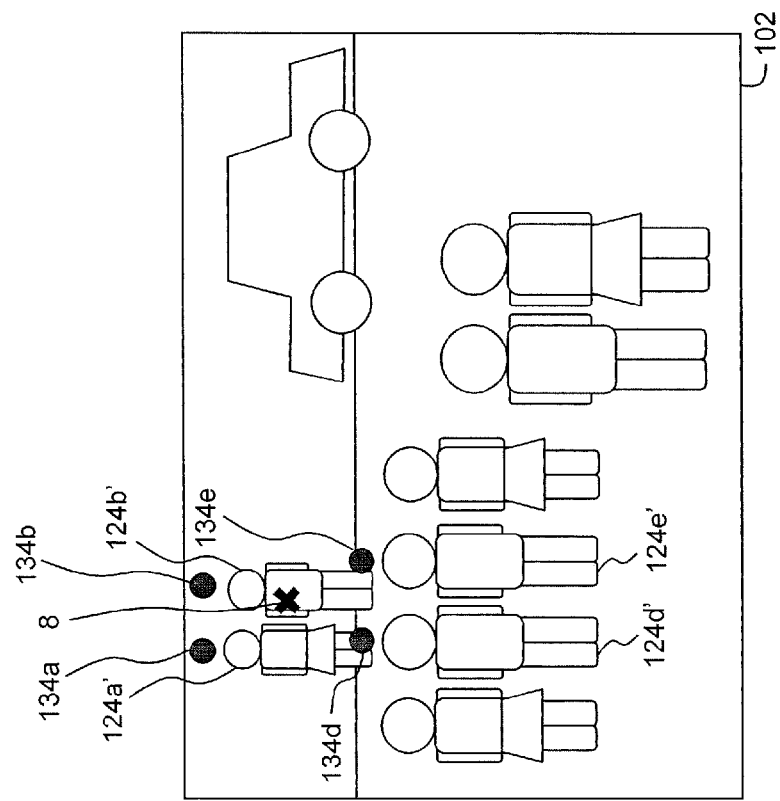
Figure 2C:
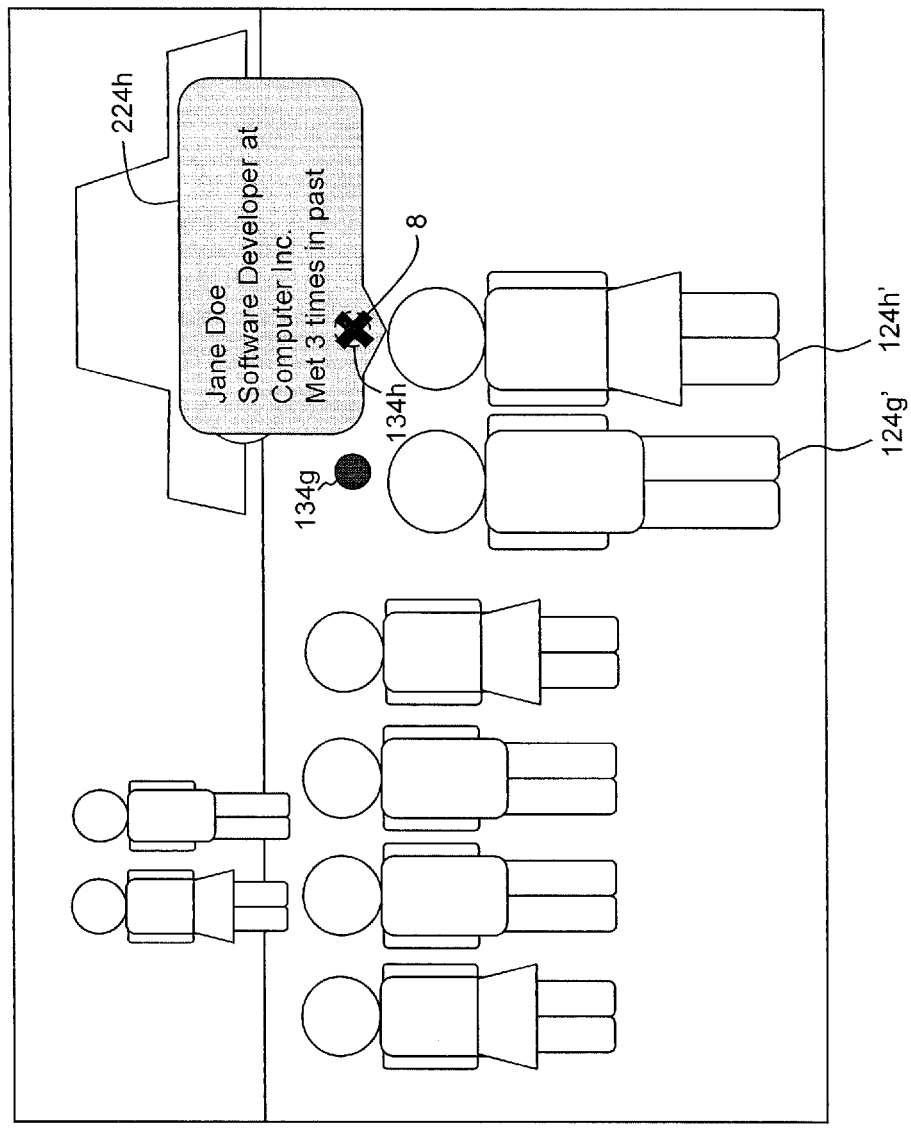

FIGS. 2A-2C provide example plan views of the display 102 of the mobile device 100 viewing the scene 120 (the user 2 and scene 120 have been omitted in the figures for simplicity). In FIG. 2A, the point of regard 8 is determined to be in close proximity to the object images 124a', 124b' 124d' and 124e'. As a result, the mobile device 100 displays respective indicators 134a, 134b, 134d, and 134e to indicate that supplemental information is available for such objects. In FIG. 2B, the point of regard 8 is tracked by the mobile device 100 to have moved near object images 124g' and 124h', and in response, the mobile device 100 displays indicators 134g and 134h to indicate that supplemental information on such objects are available. Indicators 124a', 124b', 124d' and 124e' are no longer displayed. In FIG. 2C, the point of regard 8 is tracked to move from the position in FIG. 2B to the position of indicator 134h. In response, the mobile device 100 then displays the supplemental information 224h regarding object 124h that is available to the mobile device 100.

Therefore, it can be seen that the image 130 is not overcrowded with supplemental information that may distract or obstruct the real world view of the scene 120. Indicators of supplemental information, and not the supplemental information itself, are selectively displayed overlaid the image 130. Further, as the user 2 is not focused on object images that are farther away from the point of regard 8, indicators that supplemental information is available for such objects can be omitted to further reduce the amount of additional visual elements overlaid on the real world view in image 130.

Figure 3:
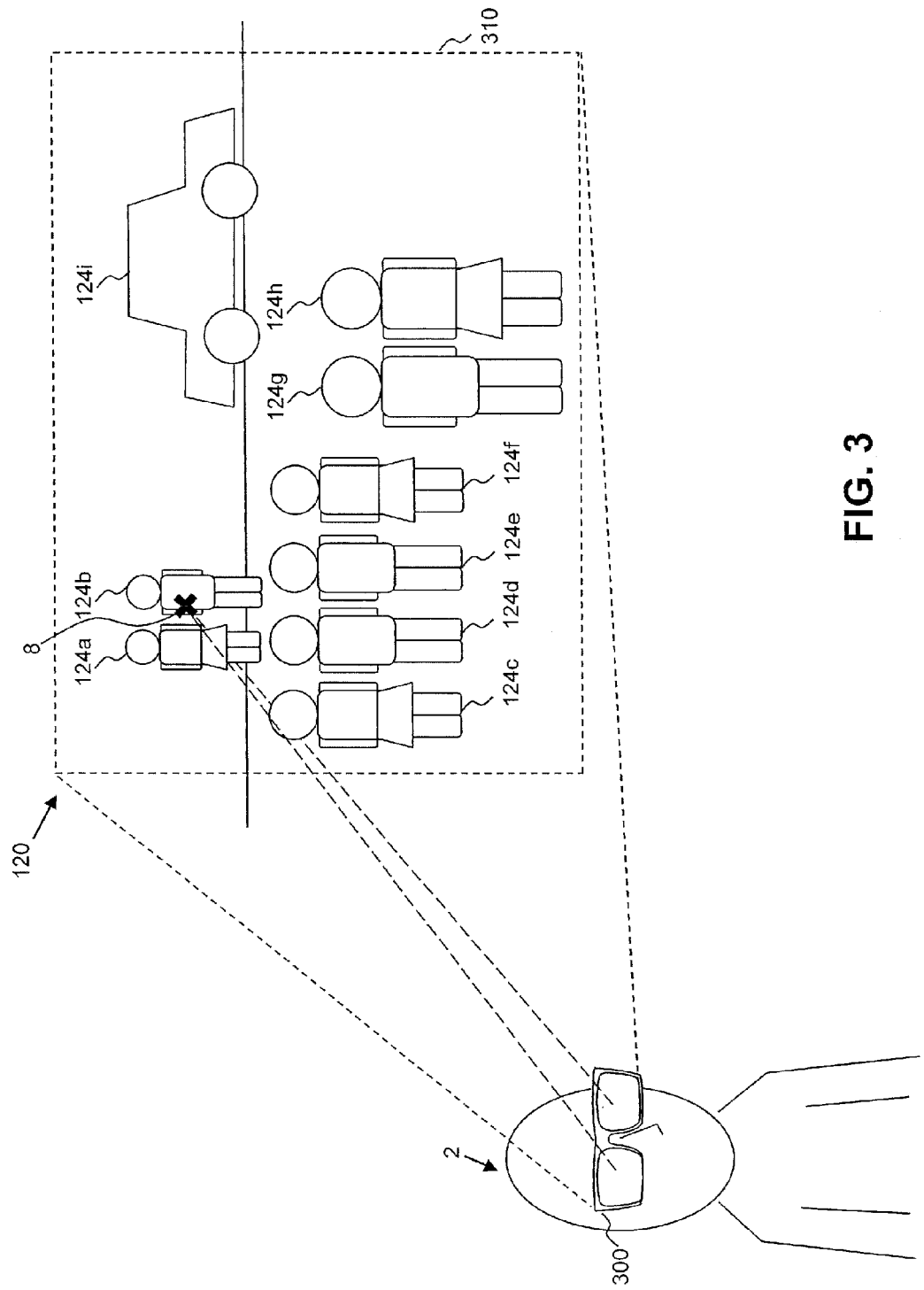
FIG. 3 is a diagram of a user viewing a scene using an example head mounted display for providing augmented reality.

FIG. 3 provides a diagram of the user 2 using another example electronic device for providing augmented reality, a head mounted display 300 (such as a pair of augmented reality glasses), to view the scene 120 in the user's field of view 310. The objects 124a-124i are included in the scene 120. In this example, the point of regard 8 of the user is focused on a portion of the object 124b.

Figure 4:
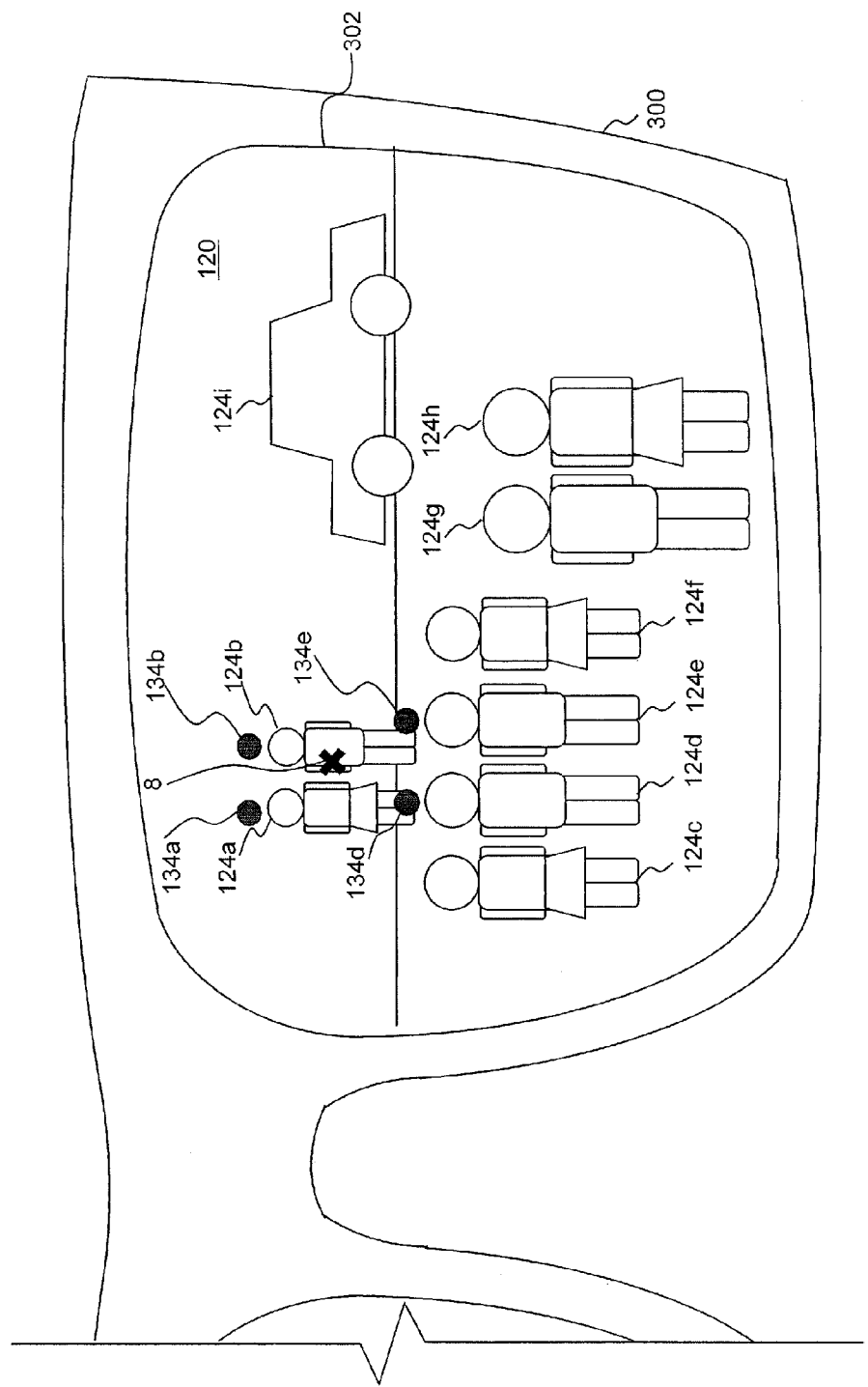
FIG. 4 is partial plan view of an example display of a head mounted display viewing a scene.

The head mounted display 300 can augment the real world view of the scene 120. Providing augmented reality using a head mounted display is well known and a number of different techniques have been developed. For example, as shown in FIG. 4, the head mounted display 300 can include a transparent or semi-transparent display 302 capable of displaying additional visual elements on the display 302 overlaid the real world view of the scene 120 that passes through the display 302 to the user 2. In some technologies, at least a portion of the display 302 can be selectively controlled to turn opaque to display additional visual elements more clearly and/or block portions of the real world view of the scene 120 from being viewed by the user 2 through the head mounted display 300.

The head mounted display 300 may also include a gaze tracker for tracking the point of regard 8 of the user 2. For example, the gaze tracker of the head mounted display 300 can include one or more backward facing camera devices, light sources and distance sensors mounted on its frame. The backward facing camera device(s), light source(s) and distance sensor(s) can be directed to one or both eyes of the user 2 to determine the point of regard 8 based on the PCCR method, for example. In FIG. 4, the determined point of regard 8 can be used to infer that the user 2 is interested in the object 124b which overlaps with the point of regard 8, and/or other objects near the point of regard 8, such as objects 124a, 124d and 124e.

Similar to the mobile device 100 of FIG. 1, the head mounted display 300 may obtain supplemental information regarding the objects 124a-124i in the user's field of view 310 of the scene 120. Instead of automatically displaying the supplemental information on the display 302 overlaid the user's view of the scene 120, the head mounted display 300 can determine the objects near the point of regard 8 of the user 2, and display indicators that supplemental information is available for each such object. In the example of FIG. 4, indicators 134a, 134b, 134d and 134e are displayed near the objects 124a, 124b and 124d and 124e, respectively, using the display 302. Similar to FIGS. 2B and 2C, the head mounted display 300 can display and remove indicators for other objects as the point of regard 8 moves near or away from such other objects. Further, in response to the point of regard 8 focusing on a specific indicator for an object, the display 302 can display the supplemental information associated with the respective object.

Examples of applicable electronic devices may include, without limitation, cellular phones, smart-phones, tablet computers, wireless organizers, personal digital assistants, computers, laptops, handheld wireless communication devices, wirelessly enabled notebook computers, portable gaming devices, head mounted displays, computer glasses, and the like. Such devices will hereinafter be commonly referred to as "mobile devices" 100 for the sake of clarity. It will however be appreciated that the principles described herein are also suitable to other electronic devices, e.g. "non-mobile" devices. For example, the principles herein are equally applicable to personal computers (PCs), tabletop computing devices, or any other computing device.

The mobile device 100 may be a two-way communication device with advanced data communication capabilities including the capability to communicate with other electronic devices or computer systems through a network of transceiver stations. The electronic device may also have the capability to allow voice communication. Depending on the functionality provided by the electronic device, it may be referred to as a data messaging device, a two-way pager, a cellular telephone with data messaging capabilities, a wireless Internet appliance, or a data communication device (with or without telephony capabilities).

Figure 5:
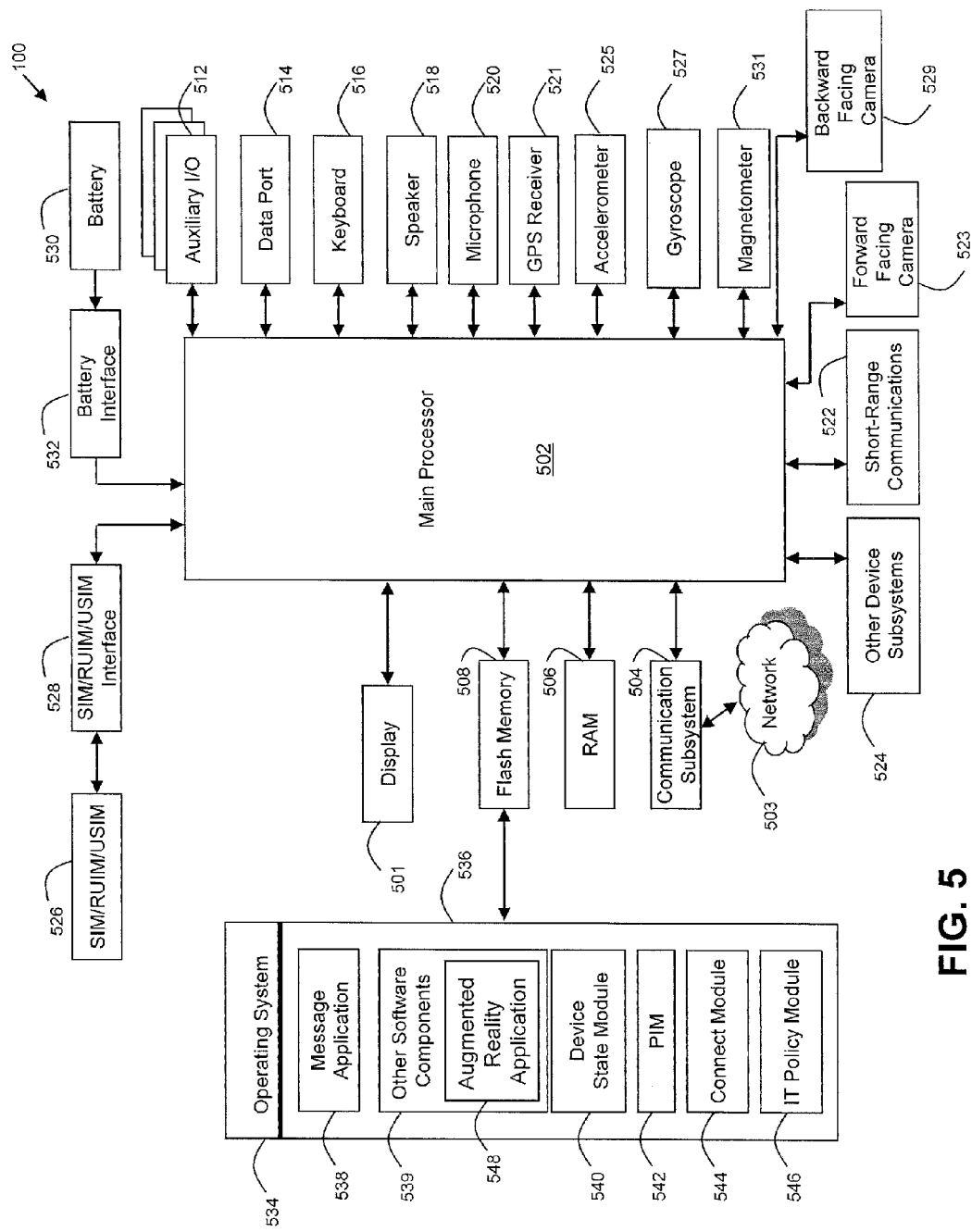
FIG. 5 is a block diagram of an example mobile device.

Referring to FIG. 5, a block diagram is provided to aid the reader in understanding an example configuration of a mobile device 100. The mobile device 100 includes a number of components such as a main processor 502 that controls the overall operation of the mobile device 100. Communication functions, including data and voice communications, are performed through a communication subsystem 504. The communication subsystem 504 receives messages from and sends messages to a wireless network 503. In this example of the mobile device 100, the communication subsystem 504 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behaviour described herein, and it will also be understood by persons skilled in the art that the example described herein are intended to use any other suitable standards that are developed in the future. The wireless link connecting the communication subsystem 504 with the wireless network 503 represents one or more different Radio Frequency (RF) channels, operating according to defined protocols specified for GSM/GPRS communications.

The main processor 502 also interacts with additional subsystems such as a Random Access Memory (RAM) 506, a flash memory 508, a display 501, an auxiliary input/output (I/O) subsystem 512, a data port 514, a keyboard 516, a speaker 518, a microphone 520, a GPS receiver 521, short-range communications 522, a forward facing camera device 523 (which can include a respective light source and distance sensor), a backward facing camera device 529 (which can include a respective light source and distance sensor), a accelerometer 525, a gyroscope 527, a magnetometer 531 and other device subsystems 524. Some of the subsystems of the mobile device 100 perform communication-related functions, whereas other subsystems may provide "resident" or on-device functions. By way of example, the display 501 and the keyboard 516 may be used for both communication-related functions, such as entering a text message for transmission over the network 402, and device-resident functions such as a calculator or task list. In an example, the display 501 can be an opaque display, such as display 102. In another example, the display 501 can be a transparent or semi-transparent display 302.

The mobile device 100 can send and receive communication signals over the wireless network 503 after required network registration or activation procedures have been completed. Network access is associated with a subscriber or user of the mobile device 100. To identify a subscriber, the mobile device 100 may use a subscriber module component or "smart card" 526, such as a Subscriber Identity Module (SIM), a Removable User Identity Module (RUIM) and a Universal Subscriber Identity Module (USIM). In the example shown, a SIM/RUIM/USIM 526 is to be inserted into a SIM/RUIM/USIM interface 528 in order to communicate with a network. Without the component 526, the mobile device 100 is not fully operational for communication with the wireless network 503. Once the SIM/RUIM/USIM 526 is inserted into the SIM/RUIM/USIM interface 528, it is coupled to the main processor 502.

The mobile device 100 is typically a battery-powered device and includes a battery interface 532 for receiving one or more rechargeable batteries 530. In at least some examples, the battery 530 can be a smart battery with an embedded microprocessor. The battery interface 532 is coupled to a regulator (not shown), which assists the battery 530 in providing power to the mobile device 100. Although current technology makes use of a battery, future technologies such as micro fuel cells may provide the power to the mobile device 100.

The mobile device 100 also includes an operating system 534 and software components 536 to 546 which are described in more detail below. The operating system 534 and the software components 536 to 546 that are executed by the main processor 502 are typically stored in a persistent store such as the flash memory 508, which may alternatively be a read-only memory (ROM) or similar storage element (not shown). Those skilled in the art will appreciate that portions of the operating system 534 and the software components 536 to 546, such as specific device applications, or parts thereof, may be temporarily loaded into a volatile store such as the RAM 506. Other software components can also be included, as is well known to those skilled in the art.

The subset of software applications 536 that control basic device operations, including data and voice communication applications, may be installed on the mobile device 100 during its manufacture. Software applications may include a message application 538, a device state module 540, a Personal Information Manager (PIM) 542, a connect module 544 and an IT policy module 546. A message application 538 can be any suitable software program that allows a user of the mobile device 100 to send and receive electronic messages, wherein messages are typically stored in the flash memory 508 of the mobile device 100. A device state module 540 provides persistence, i.e. the device state module 540 ensures that important device data is stored in persistent memory, such as the flash memory 508, so that the data is not lost when the mobile device 100 is turned off or loses power. A PIM 542 includes functionality for organizing and managing data items of interest to the user, such as, but not limited to, e-mail, contacts, calendar events, and voice mails, and may interact with the wireless network 503. A connect module 544 implements the communication protocols that are required for the mobile device 100 to communicate with the wireless infrastructure and any host system, such as an enterprise system, that the mobile device 100 is authorized to interface with. An IT policy module 546 receives IT policy data that encodes the IT policy, and may be responsible for organizing and securing rules such as the "Set Maximum Password Attempts" IT policy.

Other types of software applications or components 539 can also be installed on the mobile device 100, such as a augmented reality application 548. These software applications 539 can be pre-installed applications or third party applications, which are added after the manufacture of the mobile device 100. Examples of third party applications include games, calculators, utilities, etc.

The additional applications 539 can be loaded onto the mobile device 100 through at least one of the wireless network 503, the auxiliary I/O subsystem 512, the data port 514, the short-range communications subsystem 522, or any other suitable device subsystem 524.

The data port 514 can be any suitable port that enables data communication between the mobile device 100 and another computing device. The data port 514 can be a serial or a parallel port. In some instances, the data port 514 can be a USB port that includes data lines for data transfer and a supply line that can provide a charging current to charge the battery 530 of the mobile device 100.

For voice communications, received signals are output to the speaker 518, and signals for transmission are generated by the microphone 520. Although voice or audio signal output is accomplished primarily through the speaker 518, the display 501 can also be used to provide additional information such as the identity of a calling party, duration of a voice call, or other voice call related information.

Figures 6A, 6B:
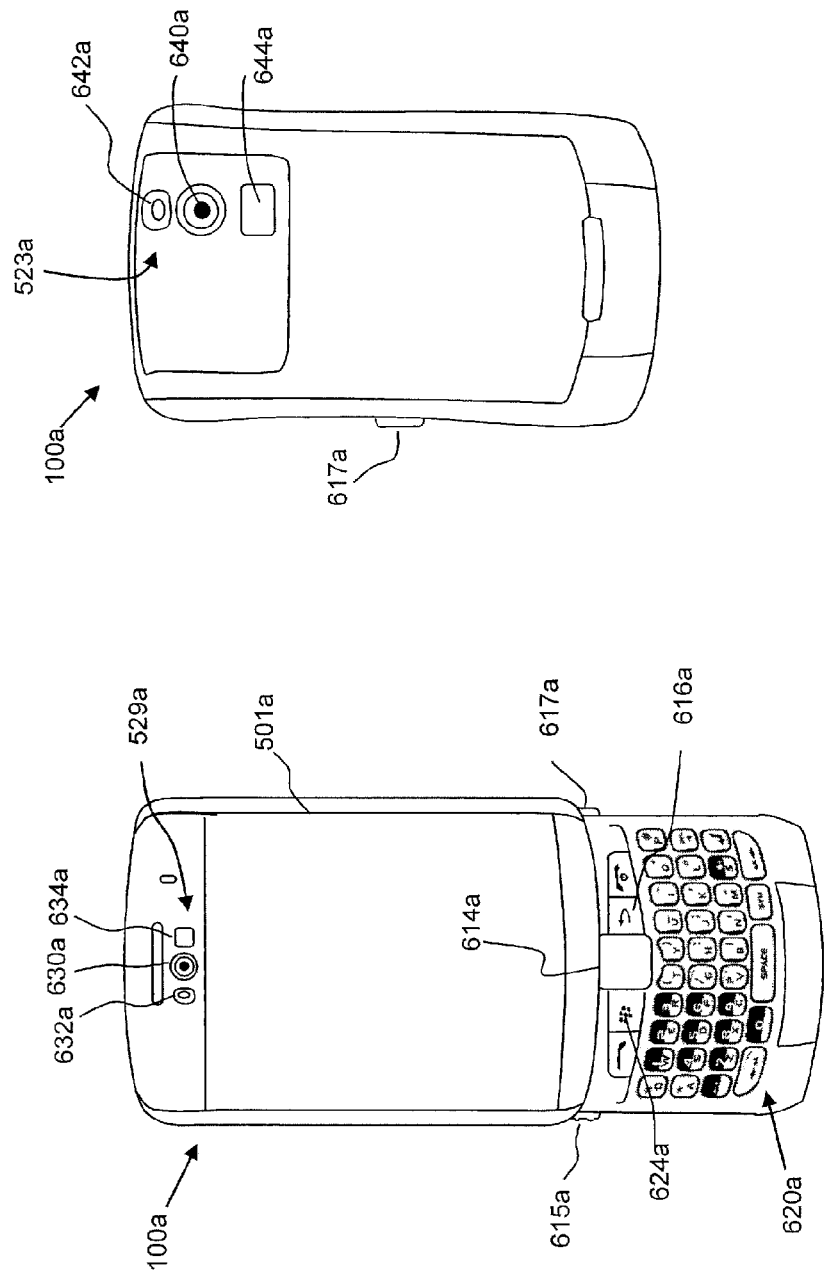
FIGS. 6A and 6B are front and back plan views of an example mobile device.

Referring to FIGS. 6A and 6B, an example of a mobile device 100a is shown in. It will be appreciated that the numeral "100" will hereinafter refer to any mobile device 100, including the example 100a, those examples enumerated above or otherwise. It will also be appreciated that a similar numbering convention may be used for other general features common between all figures.

The front face of the mobile device 100a shown in FIG. 6A includes a touch-sensitive display 501a and a cursor or positioning device, which in this example is in the form of a trackpad 614a. The trackpad 614a permits multi-directional positioning of a selection indicator or cursor that can be displayed on the touch-sensitive display 501a such that the selection cursor can be moved in an upward, downward, left and right direction, and if desired and/or permitted, in any diagonal direction. A selection cursor may include a box, alteration of an icon or any combination of features that enable the user to identify the currently chosen icon or item. The trackpad 614a in this example is situated on the front face of a housing for mobile device 100a to enable a user to maneuver the trackpad 614a while holding the mobile device 100a in one hand. The trackpad 614a may serve as another input member (in addition to a directional or positioning member) to provide selection inputs to a processor of the electronic device and can preferably be pressed in a direction towards the housing of the mobile device 100a to provide such a selection input. It will be appreciated that the trackpad 614a is only one example of a suitable positioning device. For example, a trackball, touch-sensitive display, OLED, or other input mechanism may equally apply.

The mobile device 100a in FIG. 6A also includes a programmable convenience button 615a to activate a selection application such as, for example, a calendar or calculator. Further, mobile device 100a also includes an escape or cancel button 616a, a camera button 617a, a menu or option button 624a and a slide-out keyboard 620a (shown in the extended position). The camera button 617a is able to activate photo and video capturing functions, e.g. when pressed in a direction towards the housing. The menu or option button 624a can be used to load a menu or list of options on the display 501a when pressed. In this example, the escape or cancel button 616a, the menu option button 624a, and a keyboard 620a are disposed on the front face of the electronic device housing, while the convenience button 615a and camera button 617a are disposed at the side of the housing. This button placement enables a user to operate these buttons while holding the mobile device 100a in one hand. The keyboard 620a is, in this example, a standard QWERTY keyboard, however, it will be appreciated that reduced QWERTY or virtual keyboards (e.g. as provided by a touch-sensitive display) may equally apply.

The front face of the mobile device 100a also includes a backward facing camera lens 630a (i.e. facing the user 2 when the mobile device 100 is normally in use), a backward facing light source 632a and a backward facing distance sensor 634a, collectively forming the backward facing camera device 529a. The backward facing camera device 529a can be used as part of a gaze tracker. The backward facing camera lens 630a allows light that represents an image to enter into the backward facing camera device 529a. The backward facing light source 632a may be used to illuminate an object (e.g. user 2) for capturing an image such as a photo, or a collection of images such as a video, using the backward facing camera device 529a. The backward facing distance sensor 634a measures or determines the distance between the backward facing camera device 529a and an object in the image captured by the backward facing camera device 529a.

Referring to FIG. 6B, a plan view of the back face of the mobile device 100a is provided (shown with the keyboard 620a in the retracted position). The back face of the mobile device 100 includes a forward facing camera lens 640a (i.e. facing the scene in front of the mobile device 100), a forward facing light source 642a and a forward facing distance sensor 644b, collectively forming the forward facing camera device 523a. The forward facing camera lens 640a allows light that represents an image to enter into the forward facing camera device 523a. The forward facing light source 642a may be used to illuminate an object for capturing an image such as a photo, or a collection of images such as a video, using the forward facing camera device 523a. The forward facing distance sensor 644a measures or determines the distance between the forward facing camera device 523a and an object in the image captured by the forward facing camera device 523a. The forward facing camera device 523a may be activated by pressing the camera button 617a shown in FIGS. 6A and 6B. An example of the forward facing camera device 523a is shown in FIG. 1 as camera device 104.

It will be appreciated that for the mobile device 100, a wide range of one or more positioning or cursor/view positioning mechanisms such as a touch/track pad, a positioning wheel, a joystick button, a mouse, a touch-sensitive display, a set of arrow keys, a tablet, an accelerometer (for sensing orientation and/or movements of the mobile device 100 etc.), OLED, or other whether presently known or unknown may be employed. Similarly, any variation of keyboard 620a may be used. It will also be appreciated that the mobile device 100 shown in FIGS. 6A and 6B are for illustrative purposes only and various other mobile devices 100 are equally applicable to the following examples. Other buttons may also be disposed on the electronic device housing such as colour coded "Answer" and "Ignore" buttons to be used in telephonic communications.

Figure 7:
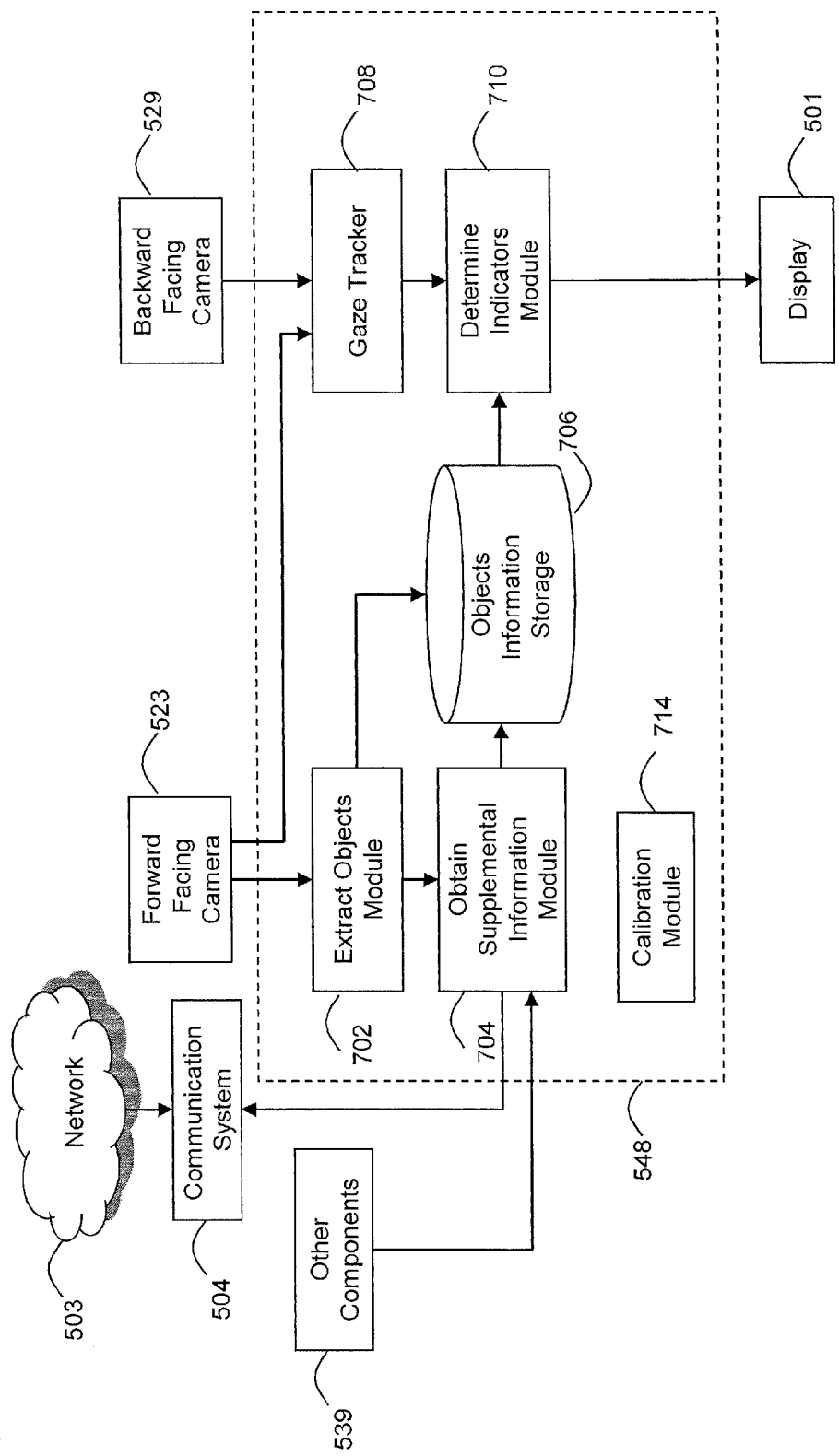
FIG. 7 is a block diagram of an example configuration of an augmented reality application.

Referring to FIG. 7, an example of a configuration for an augmented reality application 548 is provided. The augmented reality application 548 can be one of the other software applications 539 of FIG. 5 that can be loaded on the mobile device 100 or as a module incorporated in another application (e.g. part of a video or image capturing application). The augmented reality application 548 can request details of activity occurring in, or receive inputs from, image capturing devices such as the forward facing camera device 523 and the backward facing camera device 529. The augmented reality application 548 can also obtain information regarding an object captured by the forward facing camera device 523 from a network 503 (e.g. the Internet) via the communication subsystem 504 or from other components 539 that may store or be capable of accessing such information. The augmented reality application 548 also includes an extract objects module 702 for identifying objects in an image captured by the forward facing camera device 523 (e.g. objects 124a-h in the scene 120), a obtain supplemental information module 704 for obtaining supplemental information regarding objects identified in the image captured by the forward facing camera device 523, an objects information storage 706 to store information regarding an object in the image captured by the forward facing camera device 523 (such as its location and its supplemental information), a gaze tracker 708 for determining the point of regard 8 of a user 2 from an image captured by the backward facing camera device 529 and a determine indicators module 710 for determining the indicators of supplemental information to display overlaid the image captured by the forward facing camera device 523. The augmented reality application 548 can send the indicators of supplemental information to the display 501 and cause the display 501 to display the indicators overlaid an image of the scene. The augmented reality application 548 can optionally include a calibration module 714 for calibrating the gaze tracker 708.

The extract objects module 702 obtains an image from the front facing camera device 523, such as an image of the scene 120 captured in its field of view 110 (FIG. 1). The extract objects module 702 analyzes the image to identify one or more objects captured within the image. It can be appreciated that the extract objects module 702 can use techniques known and/or described herein for identifying objects within an image. For example, the extract objects module 702 may apply known image processing techniques such as facial recognition, edge detection, pattern matching, etc. In another example, the image processing techniques may be supplemented with georeferencing techniques (e.g. using the GPS receiver 521) to determine objects that may be near the location of the mobile device 100, and/or to determine the location of the objects in the scene for comparison with known objects at that location. In another example, objects in the image itself may be transmitting information that can directly be received by the mobile device 100, or uploaded to a database that can be accessed by the mobile device 100 (e.g. via the Internet). An identified object, as well as additional information associated with the object (e.g. its geo-location, location with respect to the mobile device 100, and/or location within the image) can be stored in the objects information storage 706.

The obtain supplemental information module 704 can obtain supplemental information for one or more objects identified in the image captured by the forward facing camera device 523. For example, the supplemental information can be obtained by accessing information stored locally on the mobile device 100, such as contact lists, calendar appointments, emails or other information stored or accessible by other components 539 of the mobile device 100. In another example, the augmented reality application 539 may maintain a database of supplemental information stored locally or remotely. In another example, the obtain supplemental information module 704 can access information from a remote network 503 (e.g. the Internet), including performing searches on a third-party online search provider. In another example, the supplemental information may be provided directly from the objects themselves, through a wireless connection to the mobile device 100, or by uploading such information to a database that can be downloaded by the mobile device 100. The supplemental information can be stored in the objects information storage 706.

The gaze tracker 708 obtains an image of the user 2 from the backward facing camera device 529. The backward facing camera 529 can also provide a distance reading from a distance sensor of the backward facing camera device 529. Using the image and the distance reading, the gaze tracker 708 can calculate the point of regard 8 of the user 2 captured in the image using the backward facing camera device 529. The gaze tracker 708 also receives information from the forward facing camera device 523 regarding the scene 120 captured by the forward facing camera device 523 to map the point of regard 8 of the user 2 to a corresponding point on the image of the scene 120.

The determine indicators module 710 obtains the point of regard 8 of the user 2 from the gaze tracker 708 and obtains information regarding the objects in the image captured by the forward facing camera device 523 from the objects information storage 706. The point of regard 8 is compared with the location of one or more of the objects within the image captured by the forward facing camera device 523. If the proximity of an object satisfies certain requirements, such as within a maximum distance threshold away from the point of regard 8, an indicator that supplemental information is associated with that object is displayed on the display 501. As will be discussed, additional criteria may be evaluated by the determine indicators module 710, and if the additional criteria is satisfied, the determine indicators module 710 may cause the display 501 to display the indicator. The determine indicators module 710 may also determine the visual appearance of the indicators, including varying the visual appearance among the indicators to be displayed.

The calibration module 714 can be used to enable the gaze tracker 708 to train itself for detecting a user 2 in the image and how he/she looks in the image captured by the backward facing camera device 529. For example, the augmented reality application 548 can initiate a training routine to have the user 2 look at and away from display 501 or backward facing camera 529 while the mobile device 100 is held in different positions relative to the user 2 (e.g. held directly in front, to the left, right, above, below, etc.) in order to be able to calibrate how to detect the point of regard 8.

It will be appreciated that any module, application or component exemplified herein that executes instructions or operations, such as the augmented reality application 548, may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or accessible or connectable thereto. Any application or module herein described may be implemented using computer readable/executable instructions or operations that may be stored or otherwise held by such computer readable media.

Figure 8:
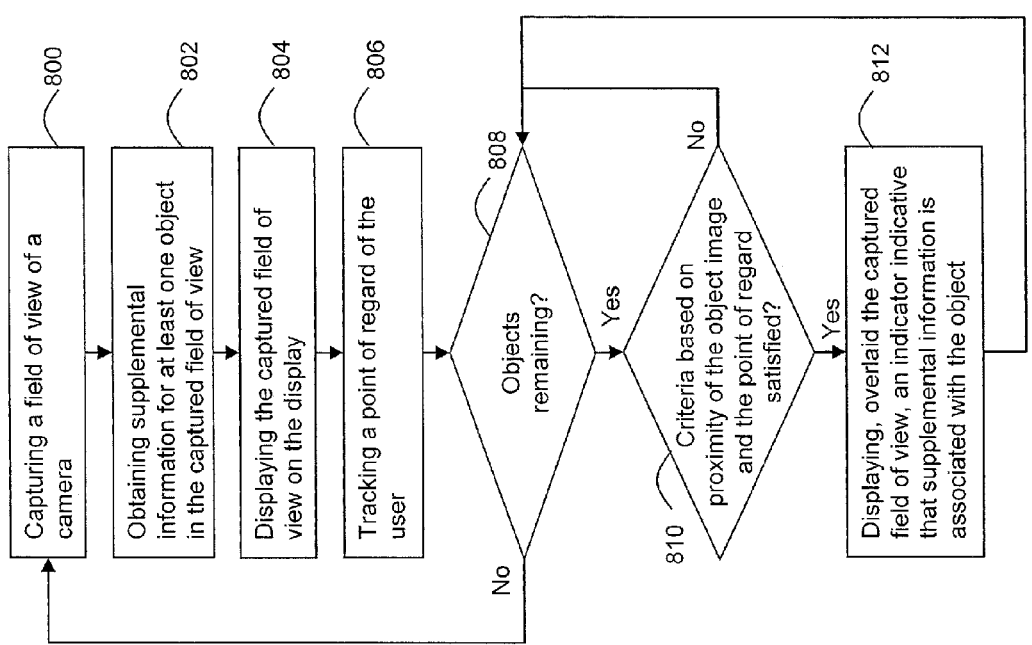
FIG. 8 is a flow diagram of example computer executable instructions for indicating a presence of supplemental information in augmented reality to a user of a mobile device.

Referring to FIG. 8, an example set of computer executable and/or processor implemented instructions is provided for indicating a presence of supplemental information in augmented reality to a user of a mobile device 100. At 800, a field of view of a camera of the mobile device 100 is captured. At 802, supplemental information for at least one object in the captured field of view is obtained. At 804, the captured field of view is displayed on the display 501 of the mobile device 100. At 806, a point of regard 8 of the user 2 is determined. At 808-812, for each object associated with supplemental information, a respective indicator is displayed, overlaid the captured field of view, if one or more criteria based on at least a proximity between the image of the object in the captured field of view and the point of regard are satisfied. The indicator is indicative that supplemental information is associated with the object. Once all the objects are evaluated based on 810 and 812, the instructions can be repeated starting at 800.

The example set of computer executable instructions may optionally include instructions for, in response to tracking that the point of regard 8 has moved to an indicator, displaying the supplemental information associated with the respective object of the indicator (FIG. 2C).

As noted above, at 800, a field of view of a camera is captured at 800. In an example configuration of the augmented reality application 548, the forward facing camera device 523 may implement 800 (FIG. 7). Referring back to the example of FIG. 1, the forward facing camera device 104 captures the scene 120 in its field of view 110.

At 802, supplemental information for at least one object in the captured field of view is obtained. In an example configuration of the augmented reality application 548, the extract objects module 702 and obtain supplemental information module 704 may implement 802. Referring back to the examples of FIGS. 1 and 2A-2C, objects 124a-h can be identified, and supplemental information for each object can be obtained. For example, the supplemental information for object 124h can include the person's name, title, employer and the number of times the user has met the person. Such supplemental information may be obtained from the records stored on or accessible by the mobile device 100, such as contact lists (e.g. from emails, instant messaging, social networks, etc.), calendar events, internet websites, etc.

At 804, the captured field of view is displayed on the display 501 of the mobile device 100. In an example configuration of the augmented reality application 548, the display 501 may obtain the captured field of view from the forward facing camera device 523 and implement 804 (FIG. 7).

At 806, a point of regard 8 of the user 2 is determined. In an example configuration of the augmented reality application 548, the gaze tracker 708 may implement 804 (FIG. 7). As discussed above, the concept of gaze tracking is well known and a number of different techniques have been developed. An example method of determining and tracking the point of regard 8 of the user 2 at 806 will now be provided. In an example embodiment, 806 can be implemented by using eye tracking algorithms or analytics (i.e. a routine or set of instructions for tracking the gaze direction 6 of the user's eyes 4), in order to calculate the point of regard 8.

By way of background, a commonly used technique is based on the so-called pupil center corneal reflection (PCCR) methods. PCCR methods typically involve using a camera device, such as the backward facing camera device 529, to capture an image of a user 2 while the user 2 is being illuminated by a light source. It has been found that PCCR methods may work optimally when using an infrared light source, however, the principles may be applied using visible light sources. The light source illuminates the user's eyes 4 and the illumination causes highly visible reflections of the light in parts of the user's eyes 4. A fraction of the light enters the pupil and is reflected off the retina to identify the pupils of the eyes 4. A fraction of the light is reflected off the cornea of the eyes 4, the reflection often referred to as a "glint". Using known image processing techniques, the centers of the pupil and the glint are identified and a vector from the center of the glint to the center of the pupil is calculated. The direction of this vector provides gaze direction information which is used with the distance between the camera device and the user's eyes 4 to calculate the point of regard 8 using known methods.

Figure 9:
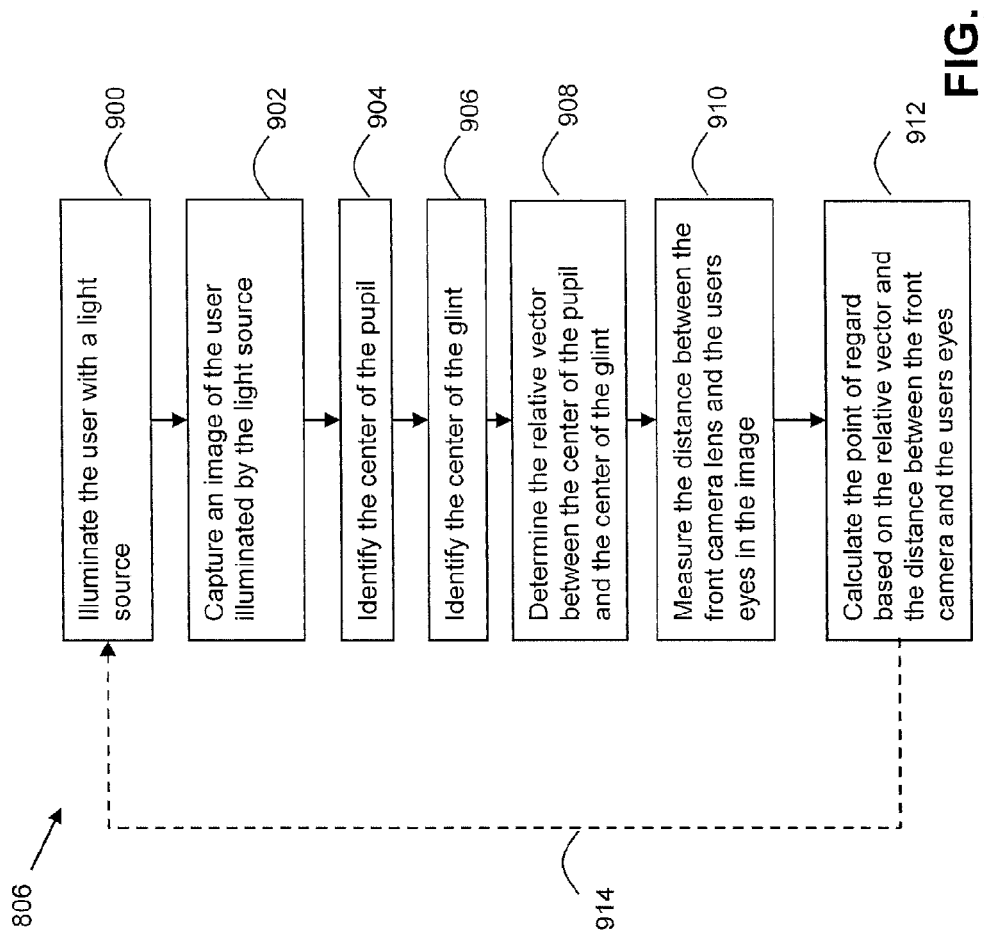
FIG. 9 is a flow diagram of an example process for tracking a point of regard of a user.

FIG. 9 shows a flow diagram of an example PCCR method to determine the point of regard 8 based on eye tracking using the mobile device 100. It can be appreciated that the following description of the eye tracking operations is for illustrative purposes and that other methods of gaze tracking are equally applicable to the principles discussed herein. At 900, the user is illuminated by the light source.

At 902, an image of the user 2 illuminated by the light source is captured by the camera device.

At 904 and 906, the center of the pupil and the center of the glint are identified, respectively. The relative vector between the center of the pupil and the center of the glint is then determined at 908.

At 910, the distance between the camera device and the user's eyes 4 is measured. Known devices and methods of determining the distance between an object and a camera can be used here. Examples of distance sensing devices include a camera, infrared optics, and an ultrasonic transmitter and receiver. Different combinations of distance sensing devices can also be used, and known methods associated with the devices for finding the distance between an object and a camera device are applicable.

In the example embodiment of FIG. 6A, the distance from the backward facing camera device 529a to the user 2 is measured by the distance sensor 634a placed adjacent to the backward facing camera lens 630a. Although the distance sensor 634a is illustrated as a separate component in FIG. 6A, the distance sensor 634a can be incorporated into other components of the mobile device 100. For example, a distance sensor 634a based on infrared light can be incorporated into an infrared light source 632a also used to illuminate the user 2 when an image is captured.

At 912, the point of regard 8 of the user 2 is calculated based on known methods using the relative vector and the distance between the camera device and the user's eyes 4.

As shown by the dotted line 914, operations 900 to 912 can be repeated to track the point of regard 8 of the user 2 over a period of time.

Referring back to FIG. 8, at 808, each object identified in the captured field of view that is associated with supplemental information is analyzed based on 810. For an object associated with supplemental information, at 810, one or more criteria based on at least a proximity between the image of the object in the captured field of view and the point of regard 8 are evaluated. If the one or more criteria are satisfied for an object, an indicator being indicative that supplemental information is associated with the object is displayed at 812. In an example configuration of the augmented reality application 548, the determine indicators module 710 may implement 808-812 using the information from the gaze tracker 708 and objects information storage 706 (FIG. 7).

The one or more criteria includes whether the object images in the captured scene 120 are within a proximity of the point of regard 8. In one example, the proximity criteria can include whether any portion of the object images are displayed within a predetermined distance from the point of regard 8, such as within area 1000 centered about the point of regard 8 (FIG. 10A). In the example of FIG. 10A, the object images 124a' and 124b' are completely within the area 1000, while a portion of the object images 124d' and 124e' (i.e. the head of persons 124d' and 124e') are within the area 1000, resulting in the proximity criteria to be satisfied for such object images and causing the augmented reality application 548 to display indicators 134a, 134b, 134d and 134e.

Figure 10B:
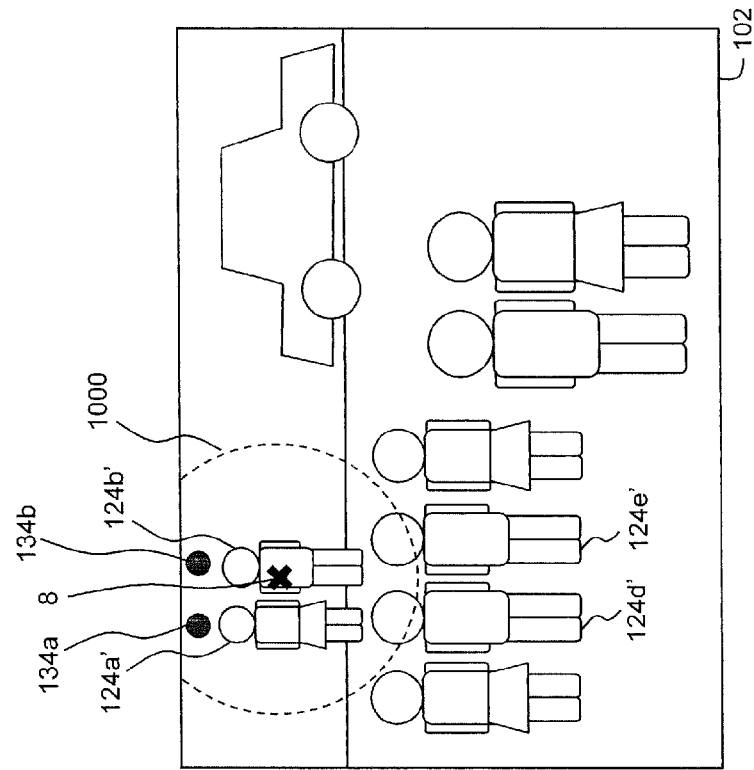
FIGS. 10A-10D are plan views of other example displays of the mobile device viewing a scene.
Figure 10A:
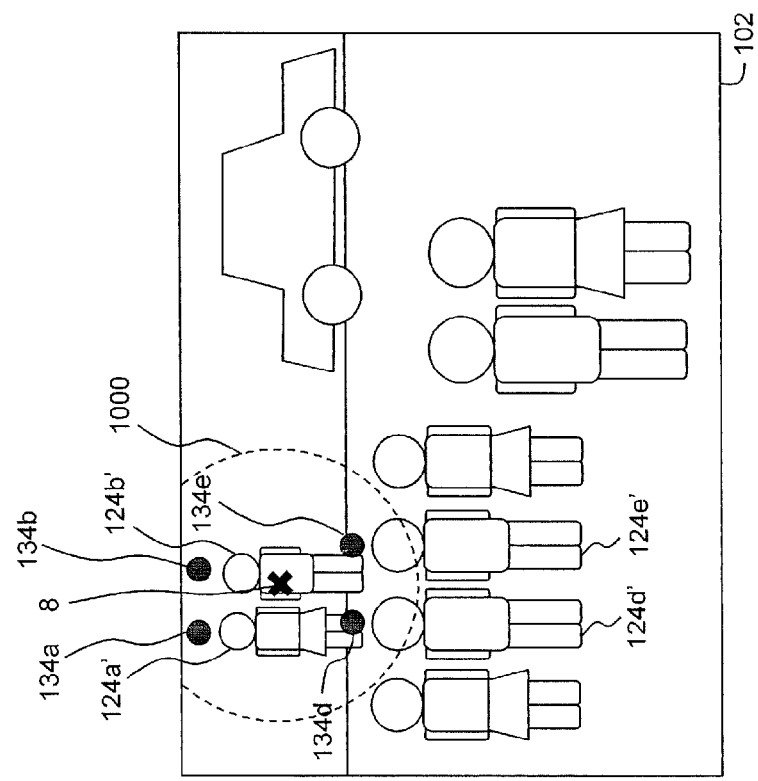

In another example, the proximity criteria may require that a threshold (e.g. 50%) of the object image area must be included within the area 1000, as shown in FIG. 10B. In this example, although a portion of the object images 124d' and 124e' are included in the area 1000, the threshold is not satisfied such that indicators 134d and 134e are not displayed.

In another example, the proximity criteria may require that the object images must be located in substantially the same plane or depth as the object image focused on or nearest to the point of regard 8. In the example of FIG. 10C, the point of regard 8 is primarily focused on object image 124b' and as a result, indicators 134a, 134b and 134i are displayed corresponding to objects images 124a', 124b' and 124i', which all lie in substantially the same plane or depth relative to the mobile device 100. The mobile device 100 may determine the depth or plane that an object image lies in using any suitable techniques available to the mobile device 100, such as image processing techniques on the captured image and/or using georeferencing techniques or distance sensors to determine the location of the mobile device 100 and the objects within the scene 120.

Figure 10D:
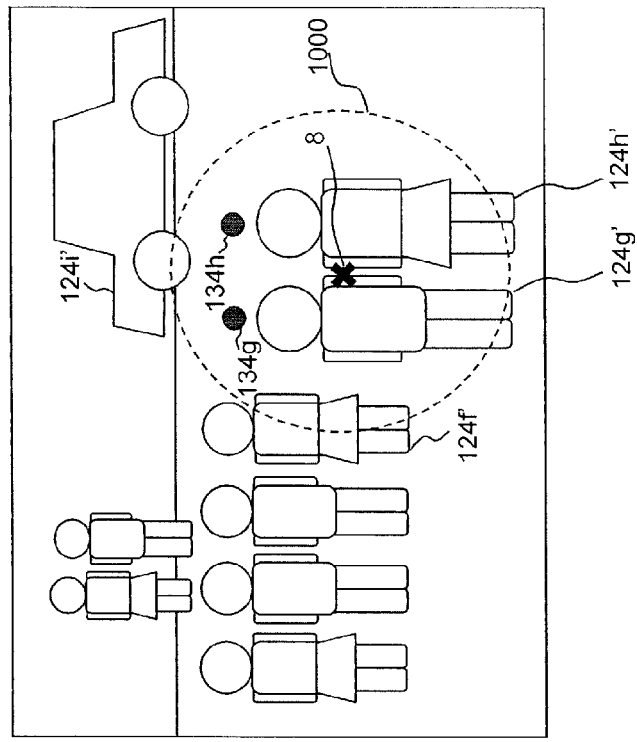
Figure 10C:
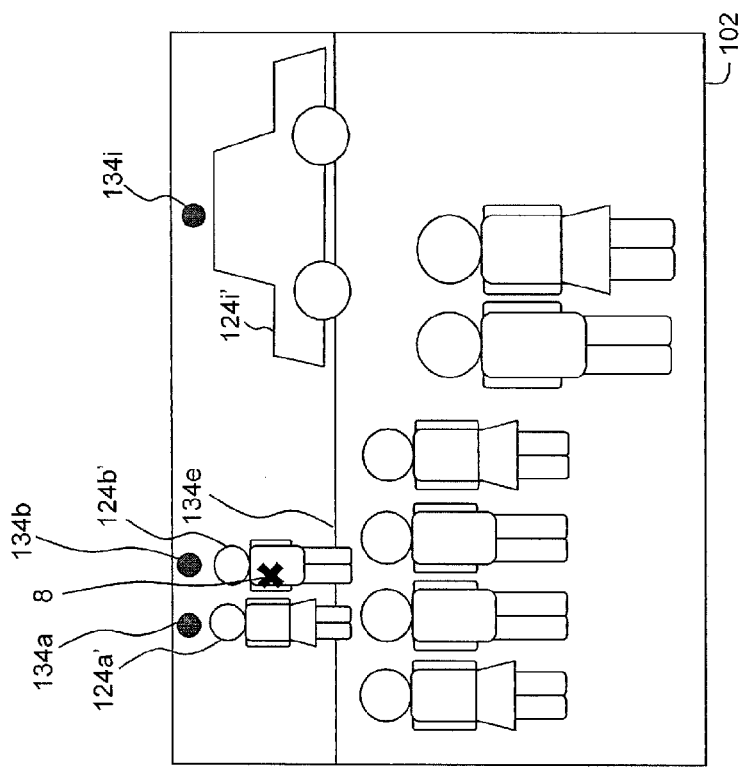

In another example, the proximity criteria may require that a dominant portion of the object image must be included within the area 1000, as shown in FIG. 10D. In this example, a dominant portion of a person object image such as 124f' may include the head of the person while a dominant portion of the car object image 124i' may include the body of the car. As a result, indicators are not displayed for object images 124f' and 124i' because the dominant portions of such object images are not within the area 1000 centred about the point of regard 8.

It will be appreciated that the proximity criteria can include any one or more of the examples described, as well as other criteria based on a proximity between an object in the captured field of view and the area that is focused on by the point of regard 8.

In the examples of FIGS. 10A-10D, the indicators take on the form of coloured dots, overlaid the real world view, near its respective object image. It will be appreciated that an indicator can be visually depicted in different ways, including displaying other indicators of different shapes, colours and sizes. The placement of the indicator can also be displayed in different positions adjacent or near its respective object image.

In another example, the indicator can include modifying the display of the respective object image, in additional, or as an alternative to displaying indicators separate and distinct from the object image. For example, an indicator can include outlining the respective object image with a border, highlighting the at least a portion of the object image with a different colour, etc.

In another example, the indicators of different objects can be displayed in a different manner. For example, the indicators that are closest to the point of regard 8 can be displayed more dominantly. The visibility of the indicators can be varied by displaying indicators in different colours (or different shades of the same colour), different sizes, different levels of transparency, etc. In the example of indicators that outline its respective object image, the outline width can be varied. In the example of indicators that highlight its respective object image, the colour and/or strength of applying the highlighting can be varied. In another example, the visibility of an indicator can be inversely proportional to the distance between the object image and the point of regard 8.

In another example, the criteria to display an indicator can also include other criteria, in addition to being based on a proximity between the object image and the point of regard 8. For example, additional criteria can be based on whether the supplemental information satisfies specific properties, such as whether the supplemental information is new or recently updated, whether the supplemental information has been previously accessed by the user 2, and based on the source of the supplemental information.

If the supplemental information has already been accessed by the user 2 using the augmented reality application 548 or otherwise, the user 2 may not desire to have the supplemental information (or an indicator that such information is available) be displayed so as to avoid redundant information being presented to the user 2.

In another example, the user 2 may only be interested in information regarding a specific set of objects, such as specific persons included in a contact list or social networking group frequently used by the user 2. Conversely, in other circumstances, the user 2 may wish to avoid having supplemental information (or an indicator that such information is available) be displayed for a contact list or social network group frequently used by the user 2 since the user may already be familiar with any such supplemental information from the user's other dealings with such objects.

In another example, an indicator may not be displayed unless the point of regard 8 remains focused on a particular area for a minimum threshold period of time so as to avoid displaying indicators in response to noise in tracking the point of regard 8 and/or to avoid rapid changes in what is displayed, which may be distracting to a user 2.

It will be appreciated that the augmented reality application 548 can include default rules and/or settings customizable by the user 2 to set other criteria that must be satisfied in order to display an indicator that supplemental information is associated with an object.

Figure 11A:
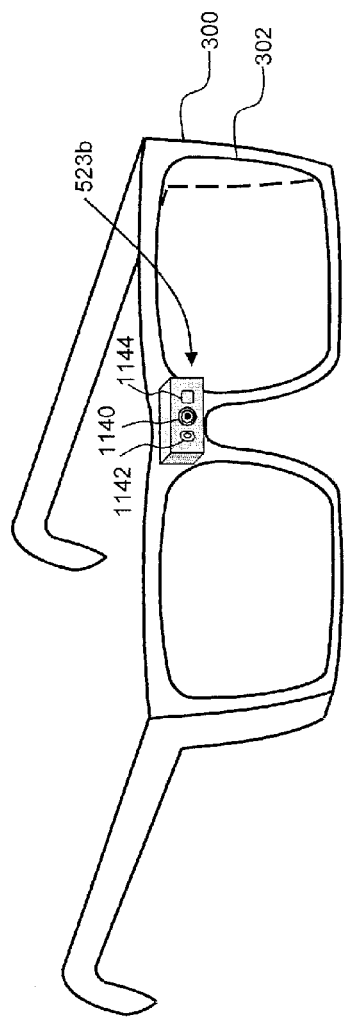
FIGS. 11A and 11B are perspective front-side and back-side views of an example head mounted display.
Figure 11B:
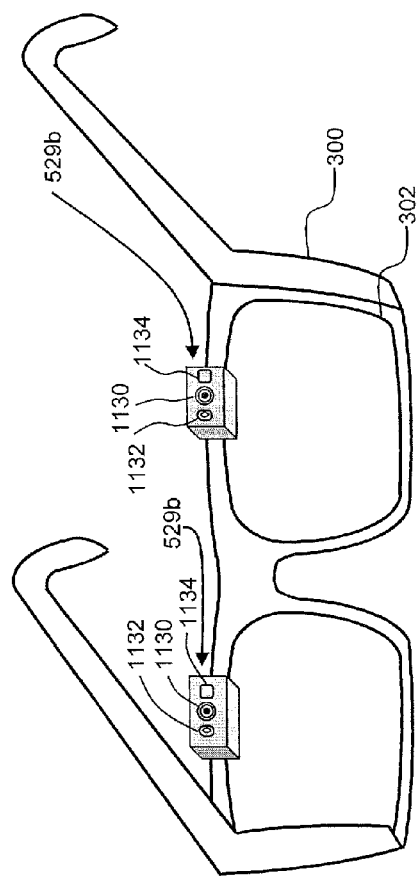

As shown in FIG. 3, an example mobile device 100 capable of providing augmented reality can be a head mounted display 300. The head mounted display 300 can include all or a subset of the components described in the example configuration of FIG. 5. Referring to FIGS. 11A and 11B, the head mounted display 300 includes a transparent or semi-transparent display 302 capable of displaying additional visual elements on the display 302 overlaid the real world view of the scene 120 that passes through the display 302 to the user 2.

The front face of the head mounted display 300 includes a forward facing camera lens 1140 (i.e. facing the scene in front of the head mounted display 300, when mounted on a user 2), a forward facing light source 1142 and a forward facing distance sensor 1144, collectively forming the forward facing camera device 523b (FIG. 11A). The forward facing camera device 523b can be configured to capture a field of view corresponding to the user's field of view 310.

The back face of the head mounted display 300 can include one or more backward facing camera lens 1130 (i.e. facing the user 2 when mounted on a user 2), backward facing light sources 1132 and backward facing distance sensors 1134, each set of components collectively forming a backward facing camera device 529b. In the example of FIG. 11B, the head mounted display 300 includes two backward facing camera devices 529b as part of a gaze tracker to independently track the point of regard 8 of each eye 4 of the user 2. In another example, a single backward facing camera device 529b can be used to track one or both eyes 4.

Other components described in the example configuration of FIG. 5 can be mounted on or within the frame of the head mounted display 300 (not shown in FIGS. 11A and 11B). In another example, the head mounted display may be connected wirelessly or by cable to another electronic device, such as another mobile device 100, so that the head mounted display 300 can obtain visual data to be processed by the other mobile device 100 and can receive processed visual data to be presented to the user 2 by the display 302.

It will be appreciated that the examples described above regarding the mobile device 100 are applicable to the head mounted display 300. In the example head mounted display 300 of FIGS. 3, 11A and 11B, the display 302 does not display the real world view of the scene 120 as the real world view passes through the display 302. As a result, the example computer executable and/or processor implemented instructions described in FIG. 8 can be modified to omit certain operations of displaying the captured field of view of the front facing camera device 523b and to reflect that the point of regard 8 of the user 2 is directed directly to objects in the scene 120 (opposed to an object image of the object, as can be the case in the example mobile device 100 of FIG. 1).

Figure 12:
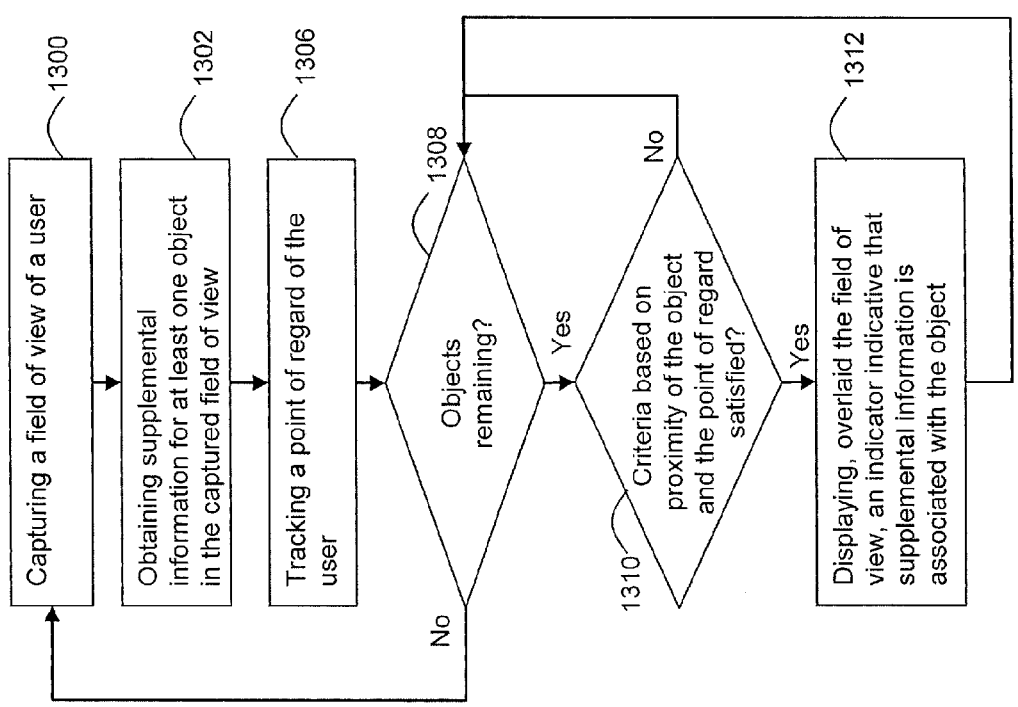
FIG. 12 is a flow diagram of example computer executable instructions for indicating a presence of supplemental information in augmented reality to a user of a head mounted display.

Referring to FIG. 12, an example set of computer executable and/or processor implemented instructions is provided for indicating a presence of supplemental information in augmented reality to a user of a head mounted display 300. At 1300, a field of view of a user of the head mounted display 300 is captured. In the example of FIG. 11A, the front facing camera device 523b can be configured to capture a field of view corresponding to the user's field of view 310.

At 1302, supplemental information for at least one object in the captured field of view is obtained. Supplemental information can be obtained in a similar manner as described with respect to 802 of FIG. 8.

At 1306, a point of regard 8 of the user 2 is determined. The point of regard 2 can be determined using the backward facing camera devices 529b in a similar manner as described with respect to 806 of FIGS. 8 and 9.

At 1308-1312, for each for each object associated with supplemental information, a respective indicator is displayed, overlaid the field of view, if one or more criteria based on at least a proximity between the object in the field of view and the point of regard are satisfied. The indicator is indicative that supplemental information is associated with the object. The indicator can be displayed on the display 302. It will be appreciated that the form of the indicator and manner in which it the indicator can be displayed, as discussed in the previous examples with respect to the mobile device 100, are applicable to the head mount display 300.

Once all the objects are evaluated based on 1310 and 1312, the instructions can be repeated starting at 1300.

The example set of computer executable instructions of FIG. 12 may optionally include further instructions for, in response to tracking that the point of regard 8 has moved to an indicator, displaying the supplemental information associated with the respective object.

Figure 13:
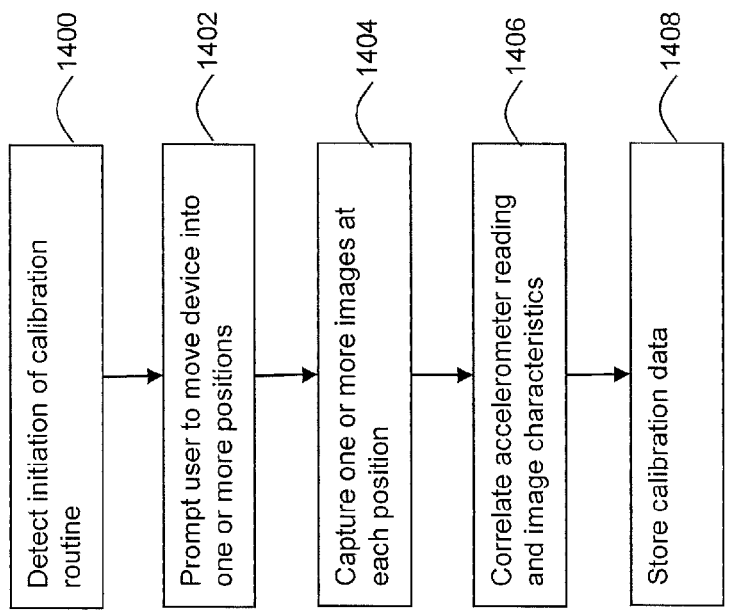
FIG. 13 is a flow diagram of example computer executable instructions for implementing a calibration routine.

As discussed above, the calibration module 714 can be used to initiate a training routine to train the augmented reality application 548. FIG. 13 illustrates an example set of computer executable instructions for implementing an example training routine. At 1400, the calibration module 714 detects initiation of the calibration routine. For example, the mobile device 100 may perform periodic calibrations, a user may select an option from a menu (not shown), or an application may make such a request, e.g. based on quality factors or other criteria. At 1402, the calibration module 714 enables a prompt to be displayed (not shown) that instructs the user to move the mobile device 100 into different positions with respect to their face/eyes. For example, the prompt may step through a series of positions asking the user 2 to hold the positions until one or more images has been taken. Any number of distinct positions can be used. At 1404, one or more images can be captured at each position. For example, an image can be captured while the user 2 is looking directly at the display 501 and another while the user 2 is looking away from the display 501 from the same position. From the images captured, various characteristics can be determined such as what shape the face/eyes take when viewed from the particular position corresponding to that image. The accelerometer 525 may also have a particular reading that can be correlated with the image characteristics at 1406. The calibration data may then be stored at 1408. The calibration data can be used to enable the augmented reality application 548 to operate more efficiently. For example, if the augmented reality application 548 would obtain a false negative due to the subject taking a particular shape in a particular position but during training it is determined that when the user tilts the mobile device 100 in a particular way they appear in the form of the particular shape when an image is taken, such false negatives can be avoided.

It will be appreciated that the examples and corresponding diagrams used herein are for illustrative purposes only. Different configurations and terminology can be used without departing from the principles expressed herein. For instance, components and modules can be added, deleted, modified, combined, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art as outlined in the appended claims.

The invention claimed is:

1. A method of indicating a presence of supplemental information in augmented reality to a user of an electronic device, the electronic device comprising a camera and a display, the method comprising:

capturing a field of view of the camera; obtaining supplemental information for at least one object in the captured field of view;

displaying the captured field of view on the display;

tracking a point of regard of the user, the point of regard being indicative of an area on the display at which a gaze of the user is focused;

determining, using a distance sensor as part of the electronic device, a first distance between the electronic device and the object; and for each object associated with supplemental information:
displaying, overlaid the captured field of view, a respective indicator if one or more criteria are satisfied, the indicator being indicative that the supplemental information is associated with the object, the one or more criteria being based on at least a proximity between an image of the object in the captured field of view and the point of regard, wherein the indicator has a visibility that is inversely proportional to a second distance between the image of the respective object and the point of regard, the visibility being at least one of a color, a shade of color, and a strength of highlighting.

2. The method of claim 1, wherein displaying the indicator comprises any one or more of: displaying an element adjacent to the image of the respective object; and modifying the display of the image of the respective object.

3. The method of claim 1, wherein the distance sensor is one of a camera, infrared optics, and an ultrasonic transceiver.

4. The method of claim 1, further comprising, in response to tracking that the point of regard has moved to the indicator, displaying the supplemental information associated with the respective object of the indicator.

5. The method of claim 1, wherein the one or more criteria are further based on at least one of whether the supplemental information was previously accessed by the user and the supplemental information having been recently updated.

6. The method of claim 1, wherein at least one of the objects is a person and one or more criteria are further based on whether the person is in a contact list and a social network.

7. The method of claim 1, wherein tracking the point of regard comprises eye tracking.

8. A non-transitory computer readable storage medium for indicating a presence of supplemental information in augmented reality to a user of an electronic device, the electronic device comprising a camera and a display, the computer readable storage medium comprising computer executable instructions for:
capturing a field of view of the camera;
obtaining supplemental information for at least one object in the captured field of view;
displaying the captured field of view on the display;
tracking a point of regard of the user, the point of regard being indicative of an area on the display at which a gaze of the user is focused;
determining, using a distance sensor as part of the electronic device, a first distance between the electronic device and the object; and
for each object associated with supplemental information:
displaying, overlaid the captured field of view, a respective indicator if one or more criteria are satisfied, the indicator being indicative that the supplemental information is associated with the object, the one or more criteria being based on at least a proximity between an image of the object in the captured field of view and the point of regard, wherein the indicator has a visibility that is inversely proportional to a second distance between the image of the respective object and the point of regard, the visibility being at least one of a color, a shade of color, and a strength of highlighting.

9. An electronic device comprising a processor coupled to memory, a camera and a display, the memory storing computer executable instructions for:
capturing a field of view of the camera;
obtaining supplemental information for at least one object in the captured field of view;
displaying the captured field of view on the display;
tracking a point of regard of a user, the point of regard being indicative of an area on the display at which a gaze of the user is focused;
a distance sensor to determine a first distance between the electronic device and the object; and
for each object associated with supplemental information:
displaying, overlaid the captured field of view, a respective indicator if one or more criteria are satisfied, the indicator being indicative that the supplemental information is associated with the object, the one or more criteria being based on at least a proximity between an image of the object in the captured field of view and the point of regard, wherein the indicator has a visibility that is inversely proportional to a second distance between the image of the respective object and the point of regard, the visibility being at least one of a color, a shade of color, and a strength of highlighting.

10. A method of indicating a presence of supplemental information in augmented reality to a user of a head mounted display, the method comprising:
capturing a field of view of the user through the head mounted display;
obtaining supplemental information for at least one object in the field of view;
tracking a point of regard of the user, the point of regard being indicative of an area in the field of view at which a gaze of the user is focused;
determining, using a distance sensor as part of the electronic device, a first distance between the electronic device and the object; and
for each object associated with supplemental information:
displaying, overlaid the field of view, a respective indicator if one or more criteria are satisfied, the indicator being indicative that the supplemental information is associated with the object, the one or more criteria being based on at least a proximity between the object and the point of regard, wherein the indicator has a visibility that is inversely proportional to a second distance between an image of the respective object and the point of regard, the visibility being at least one of a color, a shade of color, and a strength of highlighting.

11. The method of claim 10, wherein displaying the indicator comprises any one or more of: displaying an element adjacent to the respective object; and modifying the display of the respective object.

12. The method of claim 10, wherein the distance sensor is one of a camera, infrared optics, and an ultrasonic transceiver.

13. The method of claim 10, further comprising, in response to tracking that the point of regard has moved to the indicator, displaying the supplemental information associated with the respective object of the indicator.

14. The method of claim 10, wherein the one or more criteria are further based on at least one of whether the supplemental information was previously accessed by the user and the supplemental information having been recently updated.

15. The method of claim 10, wherein at least one of the objects is a person and one or more criteria are further based on whether the person is in a contact list and a social network.

16. The method of claim 10, wherein tracking the point of regard comprises eye tracking.

17. A non-transitory computer readable storage medium for indicating a presence of supplemental information in augmented reality to a user of a head mounted display, the computer readable storage medium comprising computer executable instructions for: capturing a field of view of the user through the head mounted display; obtaining supplemental information for at least one object in the field of view; tracking a point of regard of a user, the point of regard being indicative of an area in the field of view at which a gaze of the user is focused; determining, using a distance sensor as part of the electronic device, a first distance between the electronic device and the object; and for each object associated with supplemental information: displaying, overlaid the field of view, a respective indicator if one or more criteria are satisfied, the indicator being indicative that the supplemental information is associated with the object, the one or more criteria being based on at least a proximity between the object and the point of regard, wherein the indicator has a visibility that is inversely proportional to a second distance between an image of the respective object and the point of regard, the visibility being at least one of a color, a shade of color, and a strength of highlighting.

18. An electronic device comprising a head mounted display and a processor coupled to memory, the memory storing computer executable instructions for:
capturing a field of view of the user through the head mounted display;
obtaining supplemental information for at least one object in the field of view;

tracking a point of regard of a user, the point of regard being indicative of an area in the field of view at which a gaze of the user is focused;

determining, using a first distance sensor as part of the electronic device, a distance between the electronic device and the object; and for each object associated with supplemental information:
  displaying, overlaid the field of view, a respective indicator if one or more criteria are satisfied, the indicator being indicative that the supplemental information is associated with the object, the one or more criteria being based on at least a proximity between the object and the point of regard, wherein the indicator has a visibility that is inversely proportional to a second distance between the image of the respective object and the point of regard, the visibility being at least one of a color, a shade of color, and a strength of highlighting.

* * * * *